H. F. TYLER.
FURNITURE BUMPER.
APPLICATION FILED SEPT. 3, 1920.

1,398,925.  Patented Nov. 29, 1921.

INVENTOR
HARRY F. TYLER
BY Hazard & Miller
ATT'YS.

UNITED STATES PATENT OFFICE.

HARRY F. TYLER, OF REDONDO BEACH, CALIFORNIA.

FURNITURE-BUMPER.

1,398,925.  Specification of Letters Patent.  Patented Nov. 29, 1921.

Application filed September 3, 1920. Serial No. 407,848.

*To all whom it may concern:*

Be it known that I, HARRY F. TYLER, a citizen of the United States, residing at Redondo Beach, in the county of Los Angeles and State of California, have invented new and useful Improvements in Furniture-Bumpers, of which the following is a specification.

It is the object of this invention to provide a bumper which may readily be applied to and removed from the shank of the caster for a furniture leg and the like, in order to form a cushion adapted to prevent marring of the furniture or the base boards and walls, through contact between the same.

The invention will be readily understood from the following description of the accompanying drawings in which—

Figure 1:
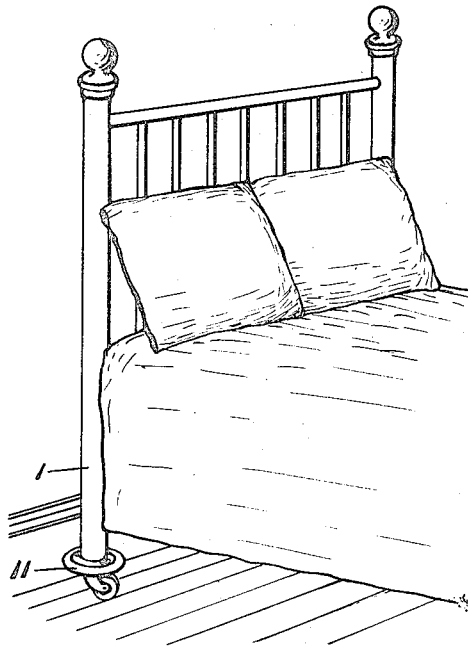
Figure 1 is a perspective view showing the improved bumper applied to the shank of the caster of a leg of a bed.
Figure 2:
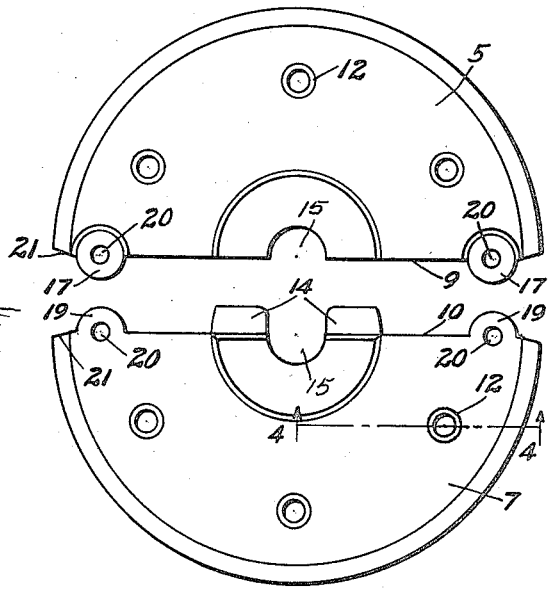
Fig. 2 is a plan view of the bumper showing the two sections of the same separated.
Figure 4:
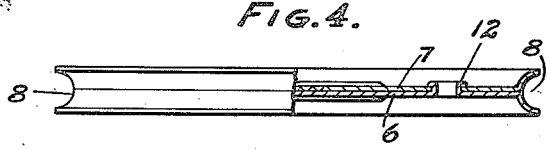
Fig. 4 is an edge view of the bumper with the cushioning means removed, the bumper being shown partially in transverse section on the line 4—4 of Fig. 2.
Figure 3:
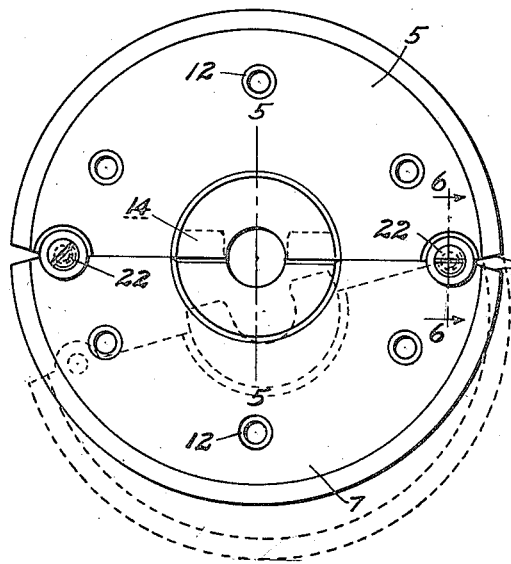
Fig. 3 is a similar view showing the sections of the bumper connected in the position they assume when in use.
Figures 5, 6:
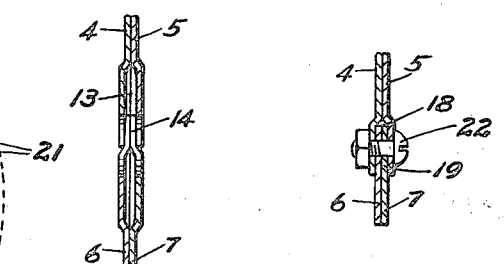

Figs. 5 and 6 are detail sections on the lines 5—5 and 6—6 of Fig. 3.

The bumper consists of a member shown as a circular plate arranged to be supported upon the shank of the caster for a leg of furniture or the like, with a cushioning ring positioned at the periphery of the plate. The plate is made in sections adapted to be swung apart so as to be received around the caster shank and then secured together in order to retain the bumper upon the caster shank while permitting the bumper to freely revolve relative to the caster.

In the form of the invention illustrated in the drawings the bumper is shown applied to the caster for a leg of a bed. The bumper consists of two sections which comprise plates 4 and 5 and 6 and 7 respectively. The plates of a section are positioned against one another with the peripheral edges of the same oppositely outwardly curved in order to form a peripheral channel 8. The meeting edges of the bumper sections are shown at 9 and 10, and when said edges are brought together, the sections of the bumper form a circular member adapted to receive a flexible cushioning ring 11 in the channel 8.

The plates 4 and 5 and 6 and 7 may be suitably secured together as by rivets 12 received through suitably alined openings in the plates forming the respective sections.

The section of the bumper formed by plates 4 and 5 is adapted to form a groove in which tongues are received formed upon the other section of the bumper. As an instance of this arrangement, plates 4 and 5 are outwardly bent medially of the edge 9 in order to form the groove 13. The plates 6 and 7 medially of the edge 10 are similarly outwardly bent, and are provided with projecting tongues 14 extending beyond the edge 10. The tongues of the respective plates 6 and 7 are inwardly bent so as to lie along side one another, as clearly shown in Fig. 5, and are received in the groove 13. The plates forming both of the sections of the bumper are provided with axial openings 15 which coöperate to form an opening extending through the bumper at the center of the same and midway of the length of the coöperating tongues and grooves. The furniture leg 1 is adapted to be received through this opening.

The two sections of the bumper are preferably removably held together at points along meeting edges 9 and 10 adjacent the periphery of the bumper. As an instance of this arrangement, the plates 4 and 5 are outwardly bent away from one another adjacent the respective ends of edge 9, and said outwardly bent portions are projected beyond the edge 9, as shown at 17, in order to form the groove 18 between said projections. The plates 6 and 7 in alinement with the grooves 18 are projected beyond the edge 10, as shown at 19, and the projections 19 are arranged to be received in the groove 18. Alined openings 20 extend through the projections 17 and 19 and suitable retaining means are adapted to be received through said alined openings. The meeting edges 9 and 10 between the projections 17—19 and the periphery of the bumper are preferably inclined away from one another, as shown at 21, in order to enable the bumper sections to be readily swung away from one another when positioning the bumper upon a caster.

In use the sections of a bumper are pivotally connected at one of the coöperating projections 17—19, as by a screw bolt 22, and the two sections may then be swung away from one another, as shown in dotted lines in the Fig. 3. The bumper is then positioned around the shank of a caster and the two sections swung toward one another until the second coacting projections 17—19 are in alinement. A screw bolt 22 may then be received through said alined projections for retaining the bumper in position upon the caster. The cushioning ring is then positioned in the peripheral channel 8.

Various changes may be made in the construction as thus described without departing from the spirit of the invention.

What is claimed is:

1. A furniture bumper comprising a plate adapted to be received around the shank of a caster, said plate comprising separable pivotally connected sections having means for connecting the swinging ends of said pivotally connected sections, and a coöperating tongue and groove at the meeting edges of said sections between said pivotal connection and said connecting means.

2. A furniture bumper comprising a plate adapted to be received around the shank of a caster, said plate comprising separable sections, one of said sections having grooved projections extending beyond its meeting edge with the other section and the second section having tongues and projecting beyond its meeting edge and adapted to be received in said grooves, and means for pivotally connecting said tongues in said grooves.

3. A furniture bumper comprising a plate adapted to be received around the shank of a caster, said plate comprising separable sections, one of said sections having grooved projections extending beyond its meeting edge with the other section and the second section having tongues projecting beyond its meeting edge and adapted to be received in said grooves, means for pivotally connecting said tongues in said grooves, said sections having their meeting edges beyond said pivotal connection inclined away from one another to permit of swinging movement of said sections relative to one another.

In testimony whereof I have signed my name to this specification.

HARRY F. TYLER.